(12) United States Patent
Masubuchi

(10) Patent No.: US 9,798,398 B2
(45) Date of Patent: Oct. 24, 2017

(54) OPERATION APPARATUS

(71) Applicant: Nintendo Co., Ltd., Kyoto (JP)

(72) Inventor: Shoji Masubuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/626,129

(22) Filed: Feb. 19, 2015

(65) Prior Publication Data

US 2015/0261321 A1 Sep. 17, 2015

(30) Foreign Application Priority Data

Mar. 17, 2014 (JP) ................................. 2014-053686

(51) Int. Cl.
*G06F 3/0362* (2013.01)
*G06F 1/16* (2006.01)

(52) U.S. Cl.
CPC ............ *G06F 3/0362* (2013.01); *G06F 1/169* (2013.01); *G06F 1/1626* (2013.01)

(58) Field of Classification Search
CPC .............. A63F 13/06; A63F 2300/1043; A63F 2300/6045; A63F 13/10; A63F 13/24; G06F 3/0213
USPC ....... 345/161, 169, 156, 184; 463/36, 37, 38
See application file for complete search history.

(56) References Cited

U.S. PATENT DOCUMENTS

| | | | | |
|---|---|---|---|---|
| 5,184,830 A | * | 2/1993 | Okada | A63F 13/10 463/29 |
| 5,563,631 A | * | 10/1996 | Masunaga | G05G 9/047 345/161 |
| 5,915,228 A | * | 6/1999 | Kunihiro | G06F 3/0236 455/566 |
| 5,984,785 A | * | 11/1999 | Takeda | A63F 13/02 345/156 |
| 6,128,006 A | * | 10/2000 | Rosenberg | G01C 21/36 345/161 |
| 6,244,959 B1 | * | 6/2001 | Miyamoto | A63F 13/06 345/419 |
| 6,285,355 B1 | * | 9/2001 | Chang | G06F 3/03543 345/156 |
| 6,297,795 B1 | * | 10/2001 | Kato | G06F 1/1626 345/169 |
| 6,546,231 B1 | * | 4/2003 | Someya | H04M 1/274525 200/4 |
| 2002/0169023 A1 | * | 11/2002 | Tanaka | A63F 13/06 463/36 |

(Continued)

FOREIGN PATENT DOCUMENTS

JP 2007-229140 9/2007

*Primary Examiner* — Koosha Sharifi-Tafreshi
(74) *Attorney, Agent, or Firm* — Nixon & Vanderhye, P.C.

(57) ABSTRACT

An example operation apparatus includes: a direction input operation section provided on a front surface of a housing of the operation apparatus and at such a position that, in a state where the operation apparatus is held with at least one hand of a user, the direction input operation section is allowed to be operated with a thumb of the hand; and a rotation operation section which is provided on a surface different from the front surface of the housing and at such a position that, in a state where the operation apparatus is held with the hand or the other hand of the user, the rotation operation section is allowed to be operated with an index finger of the hand or the other hand and which is an operation section capable of being rotationally operated.

20 Claims, 5 Drawing Sheets

(56) References Cited

U.S. PATENT DOCUMENTS

| | | | |
|---|---|---|---|
| 2003/0048252 A1* | 3/2003 | Fukushima | G06F 3/0312 345/156 |
| 2003/0076292 A1* | 4/2003 | Griffin | G06F 1/1626 345/156 |
| 2005/0116941 A1* | 6/2005 | Wallington | G06F 3/0362 345/184 |
| 2005/0159217 A1* | 7/2005 | Tawara | A63F 13/10 463/31 |
| 2005/0255915 A1* | 11/2005 | Riggs | A63F 13/06 463/37 |
| 2006/0001657 A1* | 1/2006 | Monney | G06F 3/03543 345/184 |
| 2006/0044272 A1* | 3/2006 | Koo | G06F 3/0362 345/163 |
| 2006/0066565 A1* | 3/2006 | Manley | A63F 13/06 345/156 |
| 2010/0069154 A1* | 3/2010 | Claussen | A63F 13/02 463/37 |
| 2011/0224523 A1* | 9/2011 | Budiman | A61B 5/14532 600/365 |
| 2012/0188694 A1* | 7/2012 | Sakakibara | G06F 1/1626 361/679.01 |
| 2013/0281212 A1* | 10/2013 | Tsuchiya | A63F 13/235 463/38 |
| 2014/0347330 A1* | 11/2014 | Kim | G06F 1/1637 345/184 |

* cited by examiner

OPERATION APPARATUS

CROSS REFERENCE TO RELATED APPLICATION

The disclosure of Japanese Patent Application No. 2014-053686, filed on Mar. 17, 2014, is incorporated herein by reference.

FIELD

The exemplary embodiments relate to an operation apparatus, and more particularly relates to an operation apparatus which enables an operation input by a user for performing predetermined information processing.

BACKGROUND AND SUMMARY

Hitherto, a hand-held game apparatus including so-called L and R buttons is known.

As for an existing hand-held game apparatus, an operation of pressing the above-described L or R button with an index finger is enabled while the body of the hand-held game apparatus is held with both hands. Such an operation can also be regarded as a simple operation of pressing a push-type button.

Therefore, it is a feature of the exemplary embodiments to provide an operation apparatus and the like which enable various operations.

In order to attain the feature described above, the following configuration examples are exemplified.

A configuration example is an operation apparatus enabling an operation input by a user for performing predetermined information processing. The operation apparatus includes a direction input operation section and a rotation operation section. The direction input operation section: is provided on a front surface of a housing of the operation apparatus and at such a position that, in a state where the operation apparatus is held with at least one hand of a user, the direction input operation section is allowed to be operated with a thumb of the hand; and is an operation section for direction input. The rotation operation section: is provided on a surface different from the front surface of the housing and at such a position that, in a state where the operation apparatus is held with the hand or the other hand of the user, the rotation operation section is allowed to be operated with an index finger of the hand or the other hand; and is an operation section capable of being rotationally operated.

According to the above configuration example, it is possible to provide a new operation apparatus which can effectively utilize an index finger.

In another configuration example, the rotation operation section may be provided at a position included in two of side surfaces of the housing of the operation apparatus. The rotation operation section may be provided at either one of the side surfaces of the housing of the operation apparatus. The rotation operation section may be provided near a position where two of the side surfaces of the housing of the operation apparatus intersect each other. The rotation operation section may be provided at a shoulder portion of the housing.

According to the above configuration example, since the rotation operation section is provided at such a position that the rotation operation section is easily operated with the index finger when the housing is held, it is possible to increase the operability.

In another configuration example, a rotation direction of the rotation operation section may be a rotation direction about an axis which is substantially perpendicular to the front surface of the housing.

According to the above configuration example, it is possible to perform an operation of rotating the rotation operation section in a direction along bending movement of the index finger in a state where the housing is held, and thus it is possible to increase the operability.

In another configuration example, the rotation operation section may be configured to have a pressing mechanism capable of pressing the rotation operation section in a direction toward an interior of the housing.

According to the above configuration example, it is possible to cause the rotation operation section to have a function as a push-type switch, and thus further various operations for which an index finger is utilized are enabled.

In another configuration example, the housing of the operation apparatus may be a housing having a shape which allows the operation section to be operated while the housing is held with both hands of the user.

According to the above configuration example, as an operation apparatus which is configured to be operated while being held with both hands, it is possible to provide an operation apparatus which enables various operations.

In another configuration example, the rotation operation section may include: a first rotation operation section provided at a position which allows the first rotation operation section to be operated with an index finger of a left hand in a state where the operation apparatus is held with both hands of the user; and a second rotation operation section provided at a position which allows the second rotation operation section to be performed with an index finger of a right hand in the state.

According to the above configuration example, an operation for which an index finger is utilized when the housing is held is enabled.

In another configuration example, the direction input operation section may include: a first direction input operation section provided at a position which allows the first direction input operation section to be operated with the thumb of the left hand in a state where the operation apparatus is held with both hands of the user; and a second direction input operation section provided at a position which allows the second direction input operation section to be operated with the thumb of the right hand in the state, the first rotation operation section may be provided near the first direction input operation section, and the second rotation operation section may be provided near the second direction input operation section.

According to the above configuration example, an operation for which the index fingers of both hands are utilized can be performed while a direction input operation is performed with the thumbs of both hands, and it is possible to provide an operation apparatus which enables various operations.

In another configuration example, the operation apparatus may further include a display screen on the front surface of the housing. In addition, the operation section may further include a touch panel on the front surface of the housing, for example, on the display screen.

According to the above configuration example, it is possible to provide an operation apparatus which enables further various operations.

In another configuration example, the operation apparatus may be a hand-held game apparatus.

According to the above configuration example, it is possible to provide a hand-held game apparatus which enables an operation for which an index finger is utilized.

In another configuration example, the direction input operation section may be a direction input device which enables an input in a 360 degree direction with, as a center, a neutral state which is a non-operation state. In addition, the direction input operation section may be a direction input device capable of, when an input operation is performed in a predetermined direction, outputting an intermediate value in an input performed until the direction input device reaches, from a neutral state which is a non-operation state, a limit position to which an input in the direction is enabled.

According to the above configuration example, it is possible to provide an operation apparatus which enables a direction input operation with a higher degree of freedom and enables various operations for which an index finger is utilized.

Another configuration example is an operation apparatus enabling an operation input by a user for performing predetermined information processing. The operation apparatus includes a direction input operation section and a rotation operation section. The direction input operation section: is provided on a front surface of a housing of the operation apparatus and at such a position that, in a state where the operation apparatus is held with a hand of a user, the direction input operation section is allowed to be operated with a thumb of the hand; and is an operation section for direction input. The rotation operation section is provided on a surface different from the front surface of the housing and near the direction input operation section, and is an operation section capable of being rotationally operated. The direction input operation section and the rotation operation section may be disposed at positions which allow the direction input operation section and the rotation operation section to be operated simultaneously.

According to the above configuration example, it is possible to provide a new operation apparatus which can effectively utilize an index finger.

Another configuration example is an information processing apparatus including: an operation section on which an operation input is performed by a user; and a processing section configured to perform predetermined information processing in accordance with the operation input on the operation section. The operation section includes: a direction input operation section provided on a front surface of a housing of the information processing apparatus and at such a position that, in a state where the information processing apparatus is held with at least one hand of a user, the direction input operation section is allowed to be operated with a thumb of the hand, the direction input operation section being an operation section for direction input; and a rotation operation section provided on a surface different from the front surface of the housing and at such a position that, in a state where the information processing apparatus is held with the hand or the other hand of the user, the rotation operation section is allowed to be operated with an index finger of the hand or the other hand, the rotation operation section being an operation section capable of being rotationally operated. The processing section performs information processing in accordance with an operation input on at least either one of the direction input operation section and the rotation operation section.

According to the above configuration example, it is possible to provide an operation apparatus which enables various operations and enables various information processing on the basis of the various operations.

According to the present embodiment, it is possible to provide a new operation apparatus which enables various operations.

DETAILED DESCRIPTION OF NON-LIMITING EXAMPLE EMBODIMENTS

Hereinafter, an exemplary embodiment will be described.

In the present embodiment, a description will be given with a hand-held game apparatus as an example of an operation apparatus. That is, a hand-held game apparatus including an operation section as described below itself can be regarded as an operation apparatus. In another embodiment, the embodiment described below is applicable to, for example, a game controller.

Figure 1:
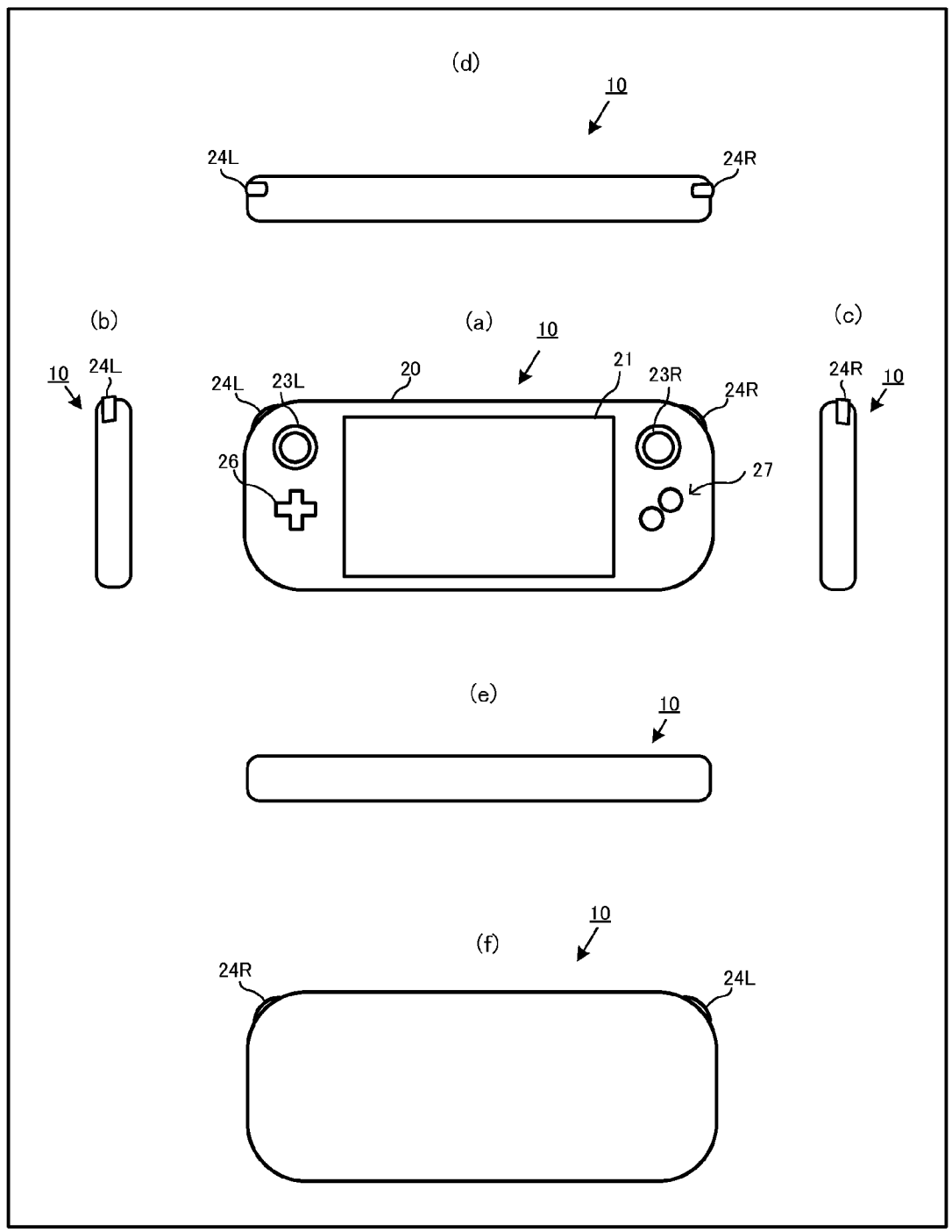
FIG. 1 is a diagram showing a non-limiting example of the external configuration of a hand-held game apparatus.
Figure 2:
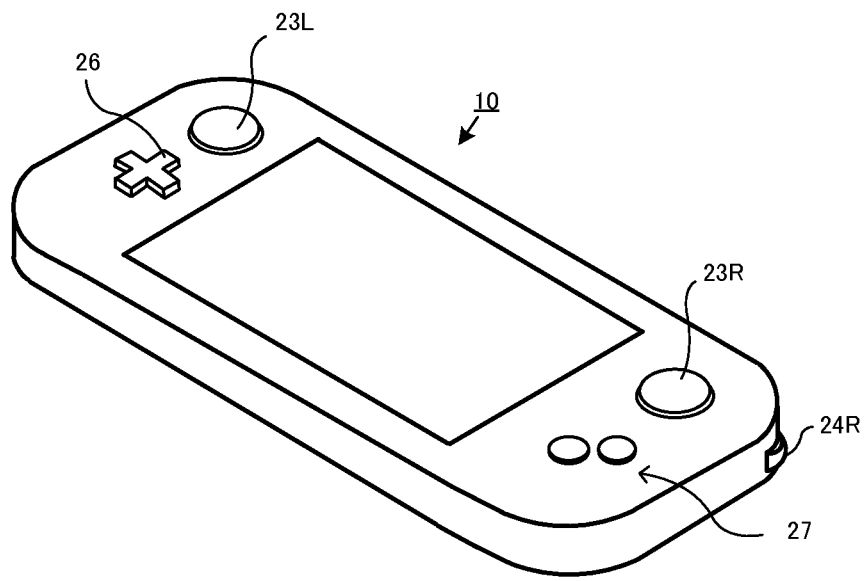
FIG. 2 is a perspective view showing a non-limiting example of the external configuration of the hand-held game apparatus.
Figure 3:
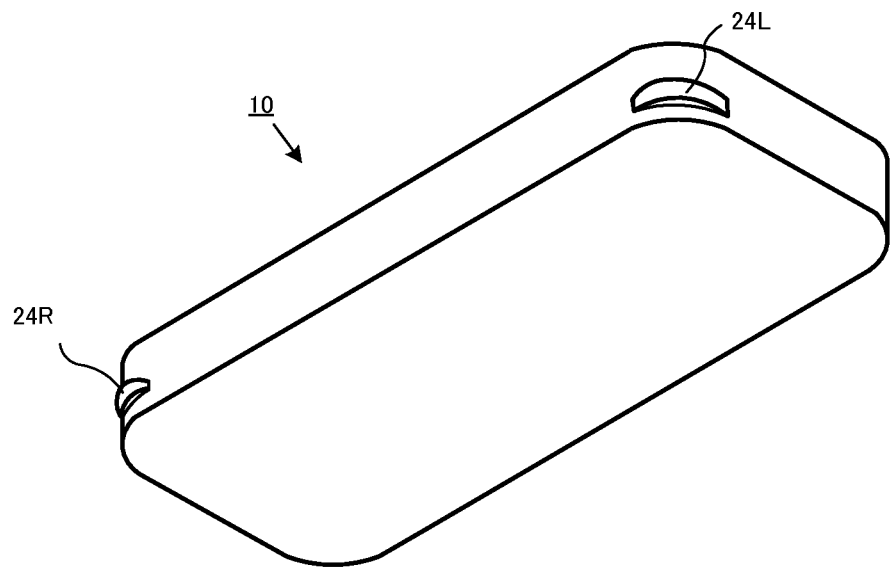
FIG. 3 is a perspective view showing a non-limiting example of the external configuration of the hand-held game apparatus.
Figure 4:
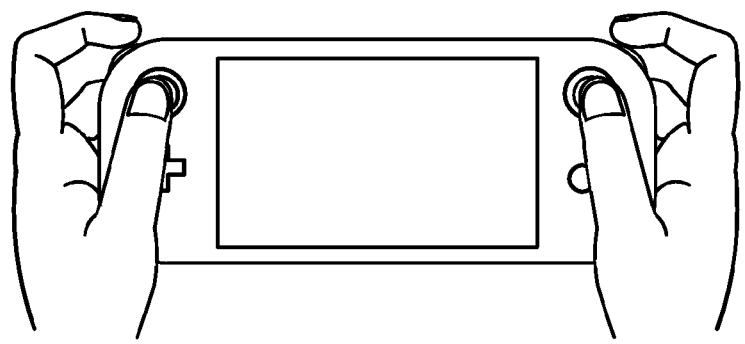
FIG. 4 is a diagram showing a non-limiting example of a state where the hand-held game apparatus is held.

With reference to FIGS. 1 to 3, a hand-held game apparatus 10 according to the present embodiment will be described. FIG. 1 is a diagram showing the external configuration of the hand-held game apparatus 10. In FIG. 1, (a) is a front view of the hand-held game apparatus 10, (b) is a left side view of the hand-held game apparatus 10, (c) is a right side view of the hand-held game apparatus 10, (d) is a top view of the hand-held game apparatus 10, (e) is a lower view (bottom view) of the hand-held game apparatus 10, and (f) is a back view (rear view) of the hand-held game apparatus 10. FIG. 2 is a perspective view of the hand-held game apparatus 10 as seen from the front downward direction, and FIG. 3 is a perspective view of the hand-held game apparatus 10 as seen from the rear upward direction. FIG. 4 is a diagram showing a state where a user holds the hand-held game apparatus 10.

As shown in FIG. 1, the hand-held game apparatus 10 includes a housing 20 having a horizontally long plate-like rectangular shape. The housing 20 is sized to be able to be held by the user.

The hand-held game apparatus 10 includes an LCD 21. The LCD 21 is provided near the center of the front surface of the hand-held game apparatus 10. Furthermore, the hand-held game apparatus 10 includes a touch panel 22 on the screen of the LCD 21. In the present embodiment, the touch panel 22 is a resistive film type touch panel. However, the touch panel is not limited to the resistive film type touch panel, and any type of touch panel, such as electrostatic capacitance type, may be used. The touch panel 22 may be of single touch type or multiple touch type.

On the front surface of the hand-held game apparatus 10, the hand-held game apparatus 10 is provided with two analog operation sections 23L and 23R (analog pads in the present embodiment) and a plurality of operation buttons (a cross key 26 and operation buttons 27A and 27B which are described later) each projecting from an opening provided in the front surface of the hand-held game apparatus 10. In addition, at obliquely upper portions (an upper left portion and an upper right portion) of the housing 20, the hand-held game apparatus 10 is provided with a first wheel type operation section 24L (hereinafter, referred to as a left wheel) and a second wheel type operation section 24R (hereinafter, referred to as a right wheel) which are capable of being rotationally operated.

These operation sections will be described in more detail. First, the first analog operation section 23L (hereinafter, referred to as a left analog operation section) is provided near the upper side of the left end of the front surface of the hand-held game apparatus 10 and at the left side of the LCD 21, and the second analog operation section 23R (hereinafter, referred to as a right analog operation section) is provided near the upper side of the right end of the front surface of the hand-held game apparatus 10 and at the right side of the LCD 21. More specifically, the left analog operation section 23L is disposed at such a position that, in a state where the user holds the left and right portions of the housing 20 with both hands, the left analog operation section 23L is allowed to be operated with the thumb of the holding left hand (more preferably, at a position at which the thumb of the left hand holding the housing 20 is naturally positioned). The right analog operation section 23R is disposed at such a position that the right analog operation section 23R is allowed to be operated with the thumb of the right hand holding the housing 20 (more preferably, at a position at which the thumb of the right hand holding the housing 20 is naturally positioned). Each of the left analog operation section 23L and the right analog operation section 23R is a slide pad which is capable of being operated by being slid in an any direction within a plane (in any direction within 360 degrees) with, as a center, a neutral state which is a non-operation state. Each of the left analog operation section 23L and the right analog operation section 23R is used for designating (inputting) the any direction. The shape of each analog operation section may be the shape of a joy stick (analog stick).

The cross key (sometimes called direction key) 26 is provided below the left analog operation section 23L and at such a position that the cross key 26 is allowed to be operated with the thumb of the left hand holding the housing 20. The cross key 26 is a cross-shaped four-direction push switch which includes operation portions corresponding to four directions (up, down, right, and left), which are respectively located on cross-shaped projecting portions arranged at intervals of 90 degrees. A player selects one of the up, down, right, and left directions by pressing one of the operation portions of the cross key 26. The cross key 26 functions according to a program executed by the hand-held game apparatus 10. The shape of the cross key 26 is not limited to the shown shape, and may be any shape as long as it allows the player to input the four directions. For example, the cross key 26 may have a shape of a round base with a protruding cross shape, or may be a set of four keys separated from each other.

The operation buttons 27A and 27B are disposed below the right analog operation section 23R and in a region where the operation buttons 27A and 27B are allowed to be operated with the thumb of the right hand holding the housing 20. The operation buttons 27A and 27B are assigned functions, respectively, in accordance with a program executed by the hand-held game apparatus 10, as necessary. For example, the operation buttons 27A and 27B are used for, for example, a determination operation and a cancellation operation.

As shown in (a), (b), (c), and (d) of FIG. 1 and FIGS. 2 and 3, the left wheel 24L and the right wheel 24R (hereinafter, sometimes collectively referred to as wheel type operation section 24) are provided at the obliquely upper portions (the upper left corner portion and the upper right corner portion) of the housing 20. Specifically, the left wheel 24L is provided at a position which is the left end of the upper side surface of the housing 20 and the upper end of the left side surface of the housing 20 (at the upper left corner, that is, at a position included in both the upper side surface and the left side surface) and is exposed from the upper and left side surfaces. The right wheel 24R is provided at a position which is the right end of the upper side surface of the housing 20 and the upper end of the right side surface of the housing 20 (at the upper right corner, that is, at a position included in both the upper side surface and the right side surface) and is exposed from the upper and right side surfaces. As described above, the left wheel 24L is disposed at a position which allows the left wheel 24L to be operated with the index finger of the left hand of the user holding the housing 20, and the right wheel 24R is disposed at a position which allows the right wheel 24R to be operated with the index finger of the right hand of the user holding the housing 20 (see FIG. 4). The left wheel 24L can be regarded as being located near the left analog operation section 23L, and the right wheel 24R can be regarded as being located near the right analog operation section 23R. Thus, it is possible to simultaneously operate the wheel type operation section 24 with the index finger while operating the analog operation section 23 with the thumb. Even in the case of such an operation, the burden on the hands is reduced.

The wheel type operation section 24 will be described in more detail. Each of the left wheel 24L and the right wheel 24R is a switch which is capable of being rotationally operated in the right-left direction as seen from the front of the housing 20 (in the right-left direction in (a) of FIG. 1). That is, each of these wheels is rotatable about an axis which is substantially perpendicular to the front surface of the housing 20. In other words, the direction of the rotation can be regarded as a direction along movement of the index finger which is made when (each joint of) the index finger is bent. Specifically, each wheel is a switch which includes a disk-shaped component allowed to be rotated in the right-left direction with the index finger of the user and is capable of detecting the rotation of the component. In the present embodiment, as a rotation sensor (rotation detection section) for rotation detection, an optical rotary encoder is used. The rotation sensor is not limited to this, and may be any sensor as long as it is capable of detecting rotation. In the present embodiment, the wheel portion of the wheel type operation section 24 is configured to be endlessly rotatable as long as rotation continues to be applied thereto. Thus, the wheel portion of the wheel type operation section 24 is configured to continue to rotate to some extent due to inertia caused by rotation of the wheel portion, even after the finger is separated from the wheel type operation section 24. In another embodiment, the wheel type operation section 24 is not limited to such a configuration which enables endless rotation, and, for example, may be configured such that the wheel portion is rotatable only 180 degrees.

Figure 5:
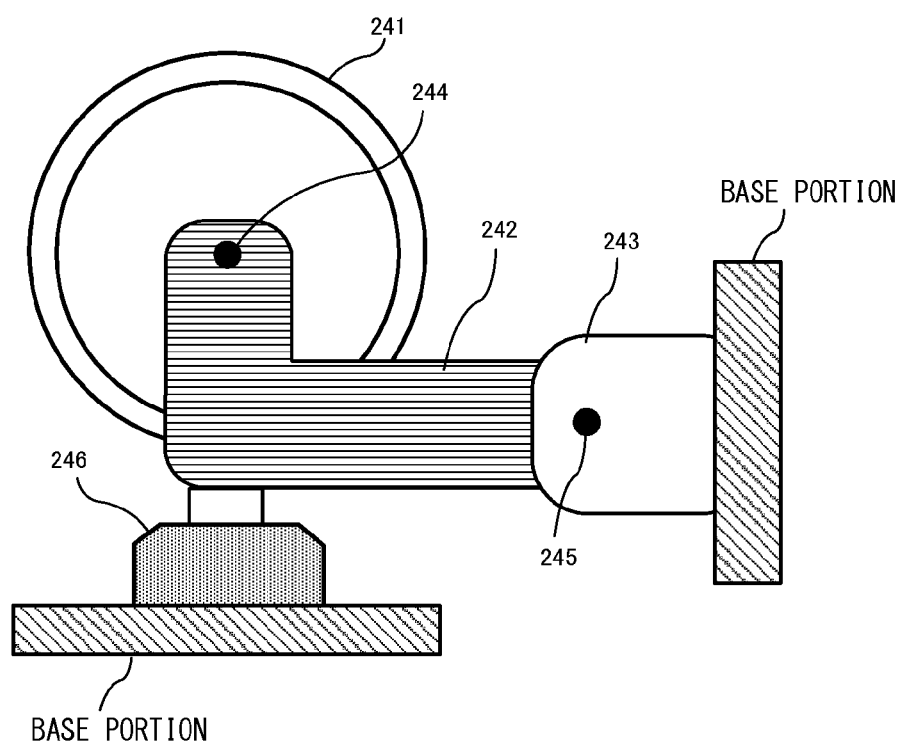
FIG. 5 is a schematic diagram of a non-limiting example of a pressing mechanism of a wheel type operation section.

In the present embodiment, each of the left wheel 24L and the right wheel 24R is capable of being pressed in a direction toward substantially the center of the housing 20 and thus serves also as a push button. That is, the wheel type operation section 24 has a pressing mechanism. FIG. 5 shows a schematic diagram of the pressing mechanism. In FIG. 5, a wheel 241 and a first rotary shaft 244 are provided at one end of a first column portion 242 having substantially an L shape. The wheel 241 is provided so as to be rotatable about the first rotary shaft 244 (although not shown, the above-described rotation sensor is also provided near the wheel). In addition, a second column portion 243 and a second rotary shaft 245 are provided at the other end of the first column portion 242. The first column portion 242 is connected to the second column portion 243 so as to be rotatable about the second rotary shaft 245. The second column portion 243 is fixedly attached to a base portion (e.g., a substrate). Furthermore, a pressing detection switch 246 is provided such that the corner portion of the L shape of the first column portion 242 is contactable therewith. The pressing detection switch 246 is also fixedly attached to the base portion. Thus, when the wheel 241 itself is pressed with the index finger, the first column portion 242 rotates about the second rotary shaft 245, so that the corner portion of the L shape is lowered. As a result, the corner portion presses down the pressing detection switch 246. Then, the pressing detection switch 246 detects the pressing-down, thereby detecting that the wheel type operation section 24 has been pressed down. The pressing mechanism is not limited to the configuration shown in FIG. 5, and may have any configuration as long as it is possible to detect that the wheel 241 has been pressed.

As described above, in the present embodiment, the wheel type operation section 24 having the pressing mechanism described above is provided at the obliquely upper (corner) portion of the housing 20. Thus, in addition to an operation of rotating the wheel portion of the wheel type operation section 24, an operation of pressing the wheel portion is also enabled to be performed with the index finger when the housing 20 is held.

Figure 6:
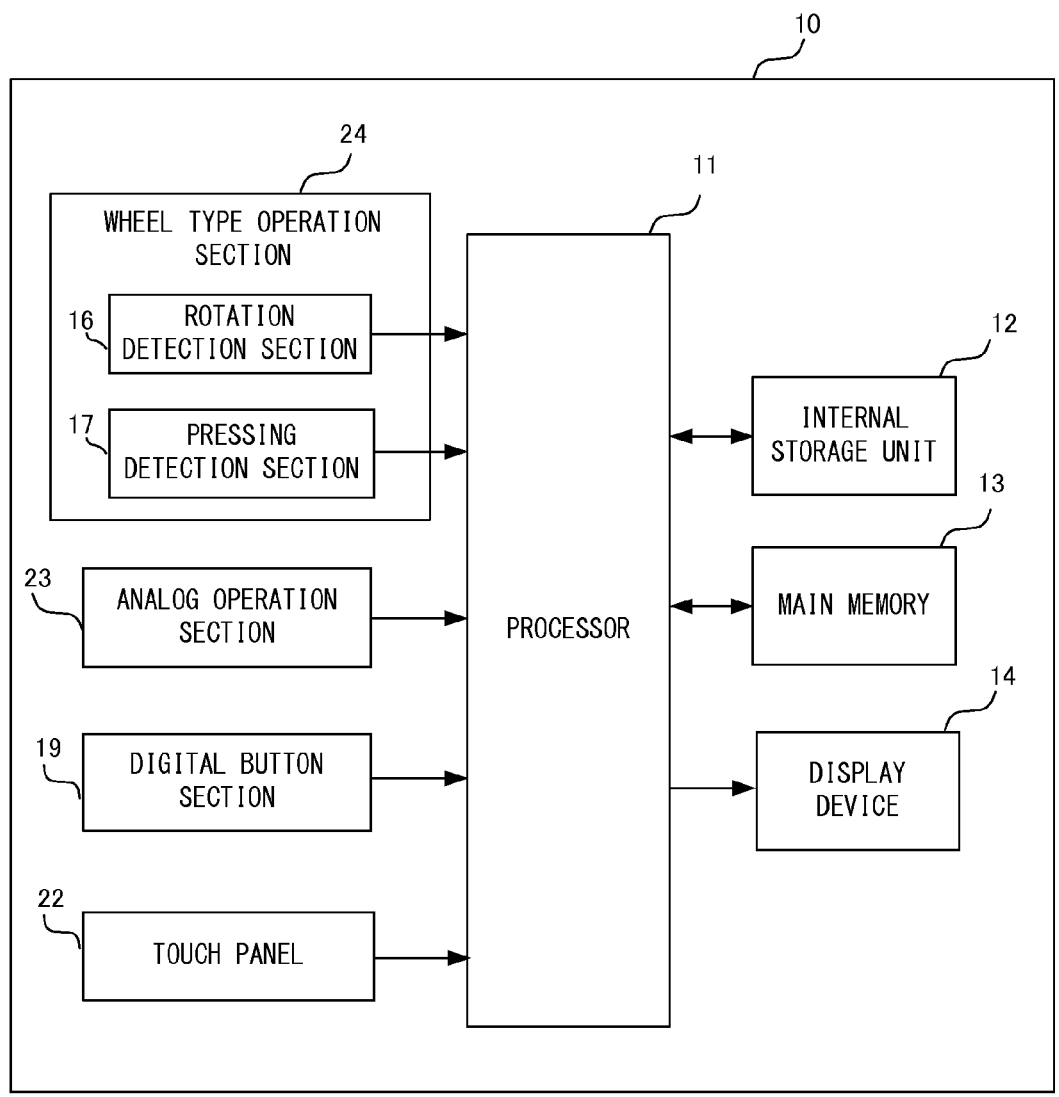
FIG. 6 is a block diagram showing a non-limiting example of the internal configuration of the hand-held game apparatus.

Next, the internal configuration of the hand-held game apparatus 10 will be described with reference to FIG. 6. FIG. 6 is a functional block diagram of the hand-held game apparatus 10. In FIG. 6, the hand-held game apparatus 10 includes a processor 11, an internal storage unit 12, a main memory 13, a display device 14, a digital button section 19, the touch panel 22, the analog operation section 23, and the wheel type operation section 24. Electronic components and the like corresponding to these components are mounted on an electronic circuit substrate and housed within the housing 20.

A computer program to be executed by the processor 11 and various data to be used in the program are stored in the internal storage unit 12. The internal storage unit 12 is, for example, a flash EEPROM. The main memory 13 temporarily stores the computer program and information. The display device 14 displays, on a screen thereof, an image generated in the hand-held game apparatus 10. In the present embodiment, the LCD 21 corresponds to the display device 14.

The touch panel 22 outputs, to the processor 11, a signal indicating a touch coordinate or the like when the touch panel 22 is operated.

The digital button section 19 is the cross key 26 and the operation buttons 27A and 27B in FIG. 1. A result of detection of an input to each of the cross key 26 and the operation buttons 27A and 27B is indicated as, for example, a signal indicative of 0 (off) or 1 (on) (i.e., a digital input).

The analog operation section 23 is the left analog operation section 23L and the right analog operation section 23R in FIG. 1. Each analog operation section 23 is capable of detecting an input signal at multiple stages, for example, a direction input for a certain direction at 256 stages. For example, a neutral position (the neutral state which is a non-operation state) is indicated as 0, a state where the analog operation section 23 is slid to its maximum in a certain direction is indicated as 255, and the analog operation section 23 is capable of outputting, to the processor 11, a signal indicating a degree of slide thereof.

The wheel type operation section 24 is the left wheel 24L and the right wheel 24R described above. Each of the left and right wheel type operation sections includes: a rotation detection section (rotation sensor) 16 for detecting rotation of the wheel; and a pressing detection section 17 (corresponding to the pressing detection switch 246 in FIG. 5) for detecting pressing of the wheel type operation section 24 as described with reference to FIG. 5. Signals (or data) obtained by detection of the rotation detection section 16 and the pressing detection section 17 are outputted to the processor 11.

In addition, although not shown, the hand-held game apparatus 10 also includes a power button, a wireless communication section, and an external terminal.

As described above, in the hand-held game apparatus 10 in the present embodiment, the above-described wheel type operation section 24 is provided at each of positions which the index fingers of the right and left hands holding the housing 20 reach (at each of the obliquely upper portions of the housing). Thus, an operation for which the index finger is effectively used is enabled. For example, in the manner where the housing 20 is held with both hands, each index finger can be regarded as having a wider movable range (higher movability) than other fingers (the middle finger, the ring finger, and the little finger). Thus, the hand-held game apparatus 10 having the above-described configuration can be regarded as providing an operation for which movability of the index finger is utilized, in addition to a simple operation of merely pressing a push-type button. That is, various operations with the index finger are enabled as compared to the case where an L button and an R button, which are merely push-type buttons, are provided at these positions. For example, the following operation and process are enabled.

As an example of an operation and a process for which the wheel type operation section 24 is used, when a screen scroll operation is performed, a scroll speed can be adjusted by using both the left wheel 24L and the right wheel 24R. For example, the scroll speed is set as "1" when either one of the right wheel 24R or the left wheel 24L is rotationally operated. A process of further increasing the scroll speed is enabled, such as doubling the scroll speed by, when either one of the right wheel 24R or the left wheel 24L is rotationally operated, also rotationally operating the other wheel. In addition, a process of increasing the scroll speed in accordance with the sum of the amounts of rotation of both wheels is also enabled. Thus, for example, a case is assumed where the user views a vertically long screen while vertically scrolling the screen. If the user desires to slowly view the screen (the user desires to slowly scroll the screen), the user simply needs to rotationally operate only either one wheel. On the other hand, if the user desires to skip to a lower portion (the user desires to quickly scroll the screen to the lower portion), the user is allowed to scroll the screen at a high speed by rotationally operating both of the wheel type operation sections. This can increase the convenience of the user.

As another example, an operation (rotating+pressing operation) is enabled in which, while either one of the wheel type operation sections 24 is rotationally operated, the other wheel type operation section 24 is pressed. In the case where each wheel type operation section 24 is used for the screen scroll operation as described above, when, while the screen is scrolled by rotationally operating either one of the wheel type operation sections 24, the other wheel type operation section 24 is pressed, for example, it is also possible to perform a process of doubling the scroll speed, decreasing the scroll speed (a braking function), or temporarily stopping the scrolling while the other wheel type operation section 24 is pressed.

The wheel type operation sections 24 may be assigned different functions, respectively. For example, screen scrolling is performed by rotationally operating the left wheel 24L, and enlargement or reduction of the screen, a font, or the like is performed by rotationally operating the right wheel 24R.

In addition, the wheel type operation sections 24 may be applied to an operation of the steering wheel of an own vehicle in a drive game or a racing game. For example, a process of turning the steering wheel may be performed by rotating the right and left wheel type operation sections 24 in the same direction.

In the hand-held game apparatus 10, the left analog operation section 23L and the right analog operation section 23R are provided near the wheel type operation sections 24 and at positions which the thumbs of the left and right hands holding the housing 20 reach. In addition, the left analog operation section 23L and the right analog operation section 23R can be used for direction input. Because of such an arrangement relationship, it is possible to operate the wheel type operation sections 24 with the index fingers while these analog operation sections are operated with the thumbs. For example, in a game such as a so-called FPS (first person shooter), a case is assumed in which a player character is equipped with a plurality of weapons. In such a case, a weapon to be used is switched by either one of the wheel type operation sections 24. The player character is moved by the left analog operation section 23L, and a view point (the direction of a virtual camera) is changed by the right analog operation section 23R. With this configuration, an operation of moving the player character and an operation of selecting a weapon can be smoothly performed, thereby improving the operability. Furthermore, by performing a process of using a weapon selected by an operation of pressing the wheel type operation section 24 (e.g., shooting a gun), it is possible to provide intuitive and smooth operability to the player.

[Modifications]

In the embodiment described above, each wheel type operation section 24 is disposed at the obliquely upper portion of the housing 20, that is, the "corner" portion of the housing 20 (more precisely, disposed such that the wheel portion is exposed). The position of each wheel type operation section 24 is not limited to such a position. In another embodiment, for example, each wheel type operation section 24 may be disposed at a position shifted to the upper side surface. That is, each wheel type operation section 24 may be disposed at a portion which is a "shoulder" of the housing 20, and within a range where (the tip) of the index finger reaches the wheel type operation section 24 when the housing 20 is held. In the present embodiment, the portion which is the "shoulder" means a region of an upper surface and a side surface located at upper right or upper left as seen from the front of the housing which region has a wider range than the above-described "corner". For example, the left wheel 24L may be provided at a position which is substantially the left end of the upper side surface of the housing 20, and the right wheel 24R may be provided at a position which is substantially the right end of the upper side surface of the housing 20 as seen from the front thereof. In this case, the left wheel 24L and the right wheel 24R may be located at positions which the index fingers of the left and right hands reach when the housing 20 is held.

In addition to the above, each wheel type operation section 24 may be provided on the back side of the housing 20 and at a position which the index finger reaches when the housing 20 is held with both hands.

In the embodiment described above, the wheel type operation sections 24 which rotate planarly (that is, rotate a disk) are taken as an example. Instead of each wheel type operation section 24 described above, for example, a trackball may be provided. In such a case as well, various operations are enabled to be performed by operating the trackball with the index finger. In addition, instead of each wheel type operation section 24, a small-size touch sensor (touch panel) may be disposed.

In the embodiment described above, the case with the hand-held game apparatus is taken as an example. However, the configuration described above is applicable to general operation apparatuses such as a game controller connectable to a stationary game apparatus or the like. In addition, in the embodiment described above, the hand-held game apparatus 10 which is operated while being held with both hands is taken as an example. However, the configuration described above is applicable to, for example, an operation apparatus which is configured to be held with one hand. In this case, the operation apparatus is operated with either the right hand or the left hand. Thus, only the one wheel type operation section 24 and the one analog operation section 23 described above need to be provided. The analog operation section 23 only needs to be disposed at a position which the thumb reaches in a state where the operation apparatus is held with one hand, and the wheel type operation section 24 only needs to be disposed at a position which the index finger reaches in this state.

Figure 7:
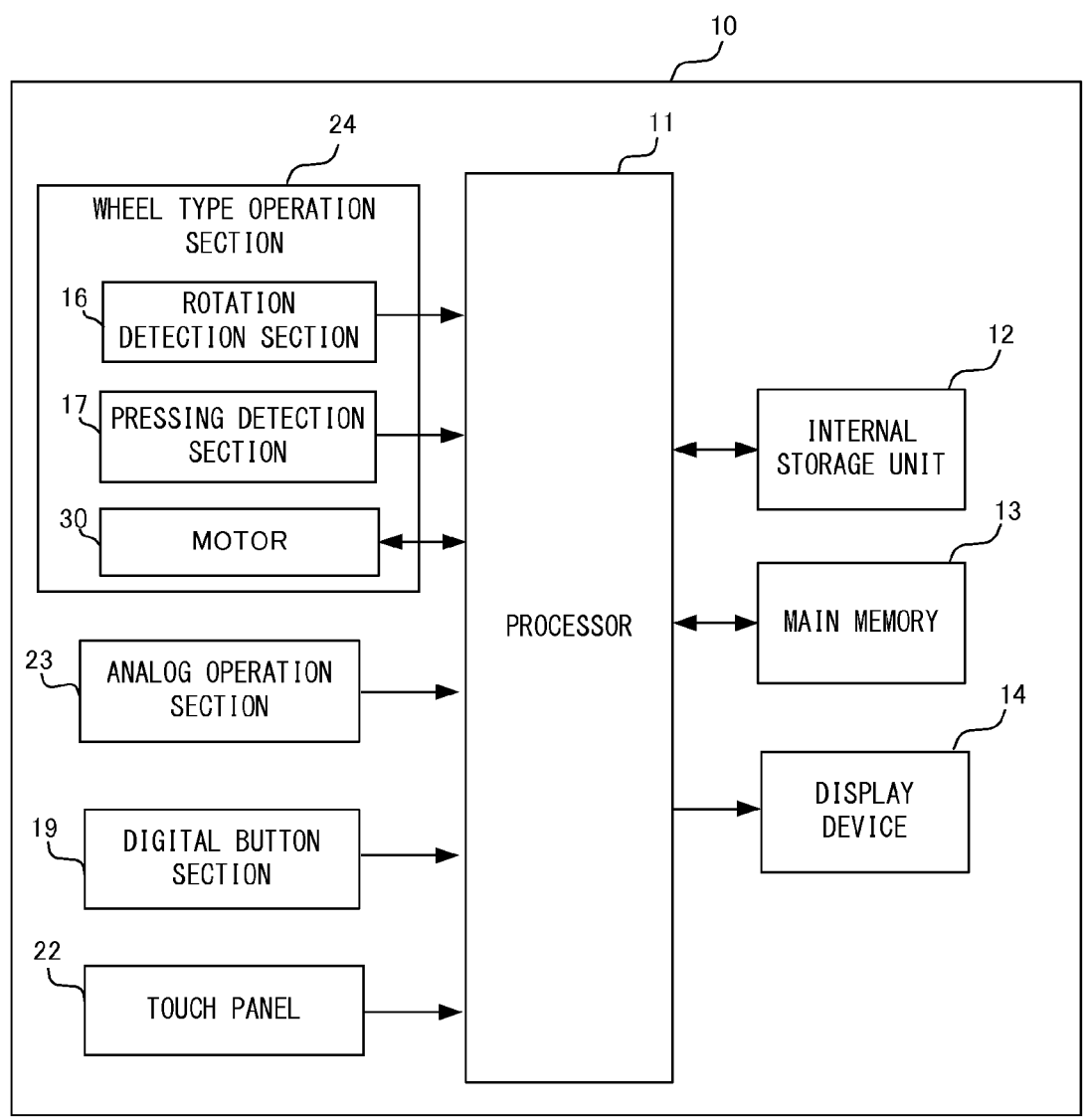
FIG. 7 is a block diagram showing a non-limiting example of the internal configuration of a hand-held game apparatus according to another embodiment.

In another embodiment, into each wheel type operation section 24 described above, a motor-controlled mechanism may be incorporated. That is, the wheel type operation section 24 may be configured such that rotation of the wheel (disk) portion (the wheel 241 in FIG. 5) is controlled by a motor (the manual rotating operation and pressing operation described in the above embodiment can also be used in combination). FIG. 7 is a functional block diagram of a hand-held game apparatus having such a configuration. In addition to the configuration shown in FIG. 6, the wheel type operation section further includes a motor 30. The motor 30 is configured to be able to rotate the above wheel by driving thereof. In addition, the motor 30 is electrically connected to the processor 11 and is configured to be controllable on the basis of an instruction from the processor 11. That is, the motor 30 is configured to be controllable via software.

When the wheel is made rotatable by driving of the motor as described above, the following process is enabled. For example, control of automatically rotating the wheel is enabled. For example, in game processing, as an alert to the player (e.g., an enemy is nearby, or a treasure box is nearby), this control is control of automatically rotating the wheel (continuously rotating the wheel). In addition, control of vibrating the wheel by alternatively repeating forward rotation and reverse rotation of the wheel at short intervals, is also enabled. Moreover, by performing control of applying reverse rotation torque for a quick moment every fixed rotation angle when the wheel is forward-rotated, it is possible to provide a click feeling (a slight resistance feeling with respect to rotation like clicking when the wheel is rotated) as a feeling provided to the fingers when the wheel is rotated.

(Appended Notes)

It is possible to extract the following configuration from the other embodiment in which motor control is used.

1. An operation apparatus enabling an operation input by a user for performing predetermined information processing, the operation apparatus comprising:
    a rotation operation section provided on a surface of a housing of the operation apparatus as an operation section capable of being rotationally operated;
    a motor; and
    a control section configured to control operation of the motor, wherein
    the rotation operation section is configured to be rotationally controllable by operation of the motor.

According to the above 1, it is possible to perform motor control via software and further rotation control of the rotation operation section, and it is possible to provide a new operation apparatus.

What is claimed is:

1. An operation apparatus for enabling an operation input by a user for performing predetermined information processing, the operation apparatus comprising:
    a housing;
    a first directional input configured to receive first direction input, the first directional input being provided on a front surface of the housing of the operation apparatus so as to be manipulable by a thumb of a first hand of the user grasping a first side of the housing;
    a first wheel configured to receive a first pressing input and to receive a first rotational input for rotating around a first axis, the first wheel being provided at a first corner defined by a first side surface and an upper surface of the housing so as to be manipulable by an index finger of the first hand grasping the first side of the housing;
    a switch; and
    an L-shaped switch actuator to which the first wheel is connected, the switch actuator being configured for rotation around a second axis different than the first axis in response to the first pressing input to the first wheel and being disposed in the housing so that a corner portion thereof actuates the switch in response to the first pressing input to the first wheel,
    wherein the first axis and the second axis are parallel to each other.

2. The operation apparatus according to claim 1, wherein the first and second axes are substantially perpendicular to the front surface of the housing.

3. The operation apparatus according to claim 1, wherein the first pressing input is directed inward toward an interior of the housing.

4. The operation apparatus according to claim 1, wherein the housing is configured to be simultaneously grasped by the first hand of the user and a second hand of the user grasping a second side of the housing.

5. The operation apparatus according to claim 4, further comprising a second wheel configured to receive a second rotational input for rotating around a third axis, the second wheel being provided at a second corner defined by a second side surface and the upper surface of the housing so as to be manipulable by an index finger of the second hand grasping the second side of the housing.

6. The operation apparatus according to claim 5, further comprising:
    a second directional input configured to receive a second direction input, the second directional input being provided on the front surface of the housing of the operation apparatus so as to be manipulable by a thumb of the second hand grasping the second side of the housing.

7. The operation apparatus according to claim 1, further comprising a display on the front surface of the housing.

8. The operation apparatus according to claim 1, further comprising a touch panel on the front surface of the housing.

9. The operation apparatus according to claim 1, wherein the operation apparatus comprises a hand-held game apparatus.

10. The operation apparatus according to claim 1, wherein the first directional input is configured to enable an input in a 360 degree direction with, as a center, a neutral state which is a non-operation state.

11. The operation apparatus according to claim 1, wherein the first directional input is configured to, when an input operation is performed in a specified direction, output an intermediate value until the first directional input reaches, from a neutral state which is a non-operation state, a limit position to which input in the specified direction is enabled.

12. An operation apparatus for enabling an operation input by a user for performing predetermined information processing, the operation apparatus comprising:
    a housing;
    a directional input configured to receive direction input, the directional input being provided on a front surface of the housing of the operation apparatus so as to be manipulable by a thumb of a hand of the user grasping a side of the housing;
    a wheel configured to receive a pressing input and to receive a rotational input for rotating around a first axis, the wheel being provided on a surface of the housing different from the front surface so as to be manipulable by an index finger of the hand grasping the side of the housing;
    a switch; and
    an L-shaped switch actuator to which the wheel is connected, the switch actuator being configured for rotation around a second axis different than the first axis in response to the pressing input to the wheel and being disposed in the housing so that a corner portion thereof actuates the switch in response to the pressing input to the wheel,
    wherein the first rotation axis and the second rotation axis are parallel to each other.

13. An information processing apparatus comprising:
    a controller; and
    a processor configured to perform information processing in accordance with inputs to the controller,
    wherein the controller includes:
        a housing;
        a directional input configured to receive direction input, the directional input being provided on a front surface of the housing so as to be manipulable by a thumb of a hand of a user grasping a side of the housing;
        a wheel configured to receive a pressing input and to receive a rotational input for rotating around a first axis, the wheel being provided at a corner defined by a side surface and an upper surface of the housing so as to be manipulable by an index finger of the hand grasping the side of the housing;

a switch; and an L-shaped switch actuator to which the wheel is connected, the switch actuator being configured for rotation around a second axis different than the first axis in response to the pressing input to the wheel and being disposed in the housing so that a corner portion thereof actuates the switch in response to the pressing input to the wheel, and wherein the processor performs information processing in accordance with input to one or both of the directional input and the wheel, and wherein the first rotation axis and the second rotation axis are parallel to each other.

14. An information processing apparatus comprising:

a housing;

a directional input disposed on a front surface of the housing;

a wheel provided on a surface of the housing other than the front surface, the wheel being configured for rotation around a first axis in response to rotational input thereto;

a switch;

an L-shaped switch actuator, coupled to the wheel, for actuating the switch in response to a pressing input to the wheel, the switch actuator being configured for rotation around a second different rotation axis in response to the pressing input to the wheel and being disposed in the housing so that a corner portion thereof actuates the switch in response to the pressing input to the wheel; and a hardware processor configured to perform processing operations based at least in part on input to one or both of the directional input and the wheel, wherein the first rotation axis and the second rotation axis are parallel to each other.

15. The information processing apparatus according to claim 14, wherein the first and second rotation axes are perpendicular to the front surface of the housing.

16. The information processing apparatus according to claim 14, wherein the directional input comprises an analog pad.

17. The information processing apparatus according to claim 14, wherein the wheel is disposed at a corner between two surfaces of the housing.

18. The information processing apparatus according to claim 14, wherein the directional input and the wheel are arranged to permit simultaneous operation by different fingers of a hand grasping the housing.

19. The information processing apparatus according to claim 14, further comprising a motor coupled to the wheel.

20. The information processing apparatus according to claim 19, wherein the motor is configured to vibrate the wheel.

* * * * *